July 17, 1962
R. D. BREMER
3,045,101
ELECTRIC PLATE HEATER
Filed Sept. 17, 1959
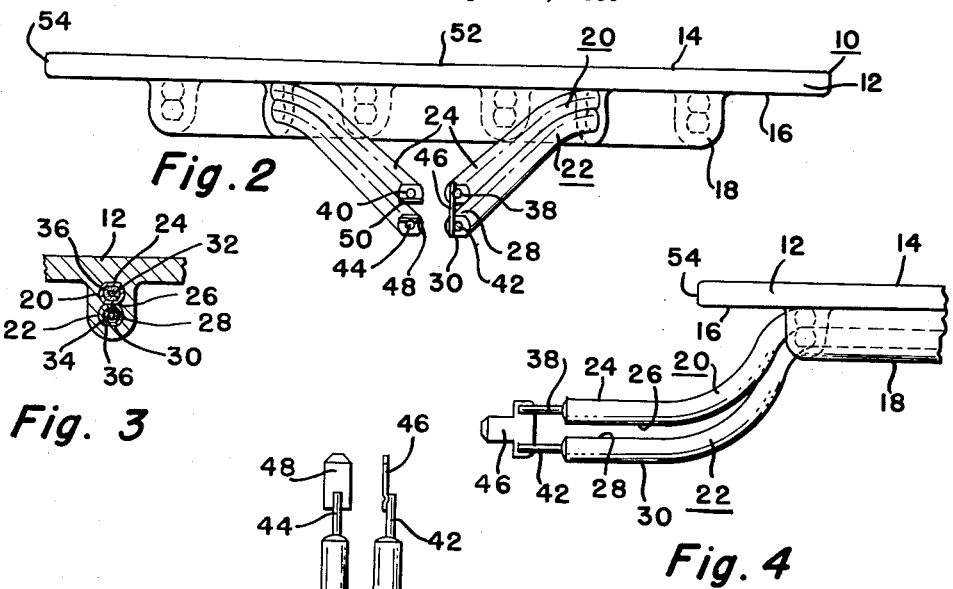
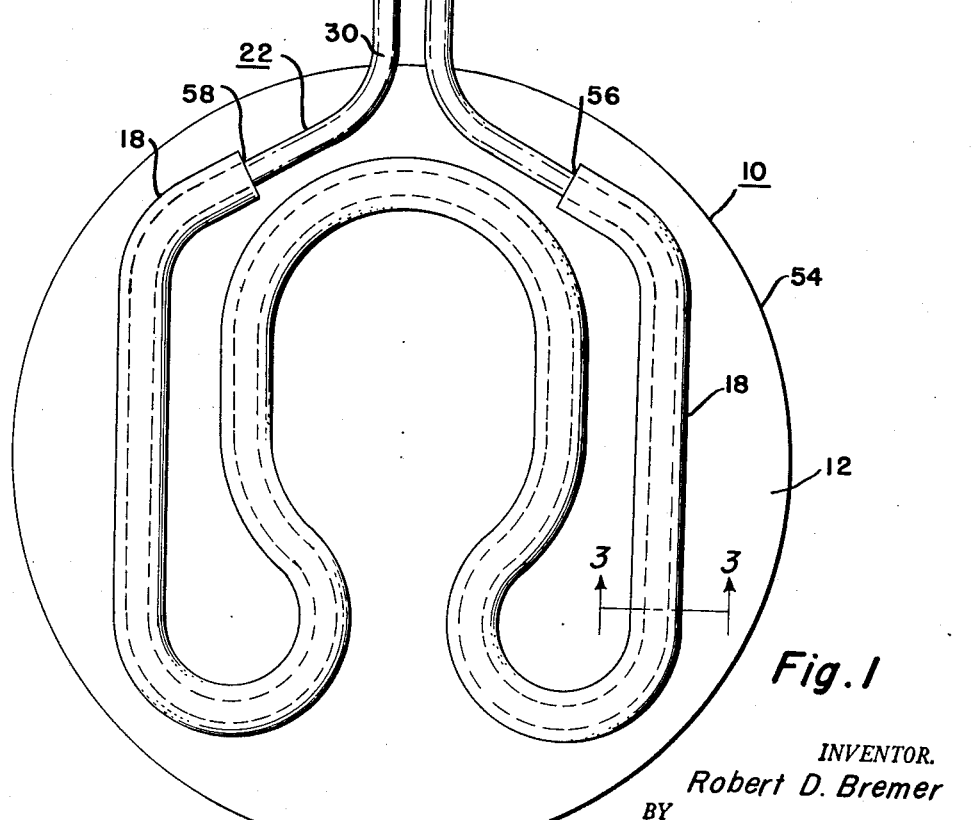
INVENTOR.
Robert D. Bremer
BY Frederick M. Ritchie
His Attorney

United States Patent Office 3,045,101
Patented July 17, 1962

3,045,101
ELECTRIC PLATE HEATER
Robert D. Bremer, Dayton, Ohio, assignor to General Motors Corporation, Detroit, Mich., a corporation of Delaware
Filed Sept. 17, 1959, Ser. No. 840,716
4 Claims. (Cl. 219—37)

This invention relates to a domestic appliance and more particularly to an improved solid plate cooking unit for an electric range.

In the electric cooking art, it has become standard practice to use spirally coiled tubular sheathed heating elements as the cooking units for an electric range. These coiled units improved over their earlier solid-plate counterparts in that they heated rapidly and were substantially durable. However, the coiled units do have certain disadvantages. For instance, the coiled units are difficult to clean and do not distribute their heat output evenly to utensils placed thereon. It is to the solution of these disadvantages and problems that this invention is directed.

Accordingly, it is an object of this invention to provide a solid plate cooking unit with a heating element cast integrally therewith.

It is another object of this invention to provide a cast solid plate cooking unit with integral heating elements arranged in stacked or nested relationship on the underside thereof.

A further object of this invention is the provision of a solid plate cooking unit having integrally cast heating elements which are stacked vertically to eliminate interwinding of the element convolutions.

Another object of this invention is the provision of a solid plate cooking unit having a single protuberance on one side thereof for housing a plurality of heating elements.

It is also an object of this invention to provide a solid plate cooking unit formed of an iron or aluminum casting and having a single protuberance thereon for housing a plurality of coils, whereby the overall mass of the cooking plate is minimized.

A still further object of this invention is the provision of a heater designed to accommodate higher wattages without overloading the heating elements therein.

An additional object of this invention is to provide a plate-type cooking unit for an electric range which effects multiple heat output with even heat distribution from the surface of the unit.

It is also an object of this invention to provide a solid plate cooking unit with a slightly tapered top surface to prevent movement of utensils placed thereon.

Further objects and advantages of the present invention will be apparent from the following description, reference being had to the accompanying drawings wherein preferred embodiments of the present invention are clearly shown.

In the drawings:

FIGURE 1 is a bottom elevational view of the solid plate cooking unit of this invention.

FIGURE 2 is a side elevational view of the cooking unit seen in FIGURE 1.

FIGURE 3 is a fragmentary sectional view of the cooking unit casting taken along line 3—3 of FIGURE 1.

FIGURE 4 is a fragmentary side elevational view of the cooking unit seen in FIGURE 1.

In accordance with this invention and with reference to FIGURE 2, a cooking unit 10 is shown comprised of a generally circular plate-like casting or support portion 12 having a top surface 14 and a bottom surface 16. The casting may be of any good grade of cast iron as well as of other metals, such as aluminum. It is important in one aspect that the metal selected for the casting be capable of conducting heat rapidly from a source of heat to the surface 14 of the casting.

The casting 12 has formed on its bottom surface 16 a depending protuberance or heater-housing portion 18 which is designed to house an upper heating element 20 in juxtaposition to the bottom surface 16 and a bottom heating element 22 in juxtaposition to the upper heating element and in vertically stacked relationship immediately therebelow. The heating elements 20 and 22 serve to supply heat energy to the casting 12 whenever they are selectively energized from any conventional domestic electrical supply. Both heating elements 20 and 22 have their top and bottom sides flattened slightly respectively at 24, 26 for the heating element 20 and at 28, 30 for the heating element 22. This slight flattening facilitates the nesting or stacked relationship of the heating elements when cast in an embedded relationship with the protuberance 18 and also aids in reducing the over-all height of the plate-type cooking unit 10. Further, the flat surfaces 26 and 28 meet along a more uniform plane than would be possible if the elements 20 and 22 were left in their round cylindrical configuration.

Within the heating elements 20 and 22 are resistance wires 32 and 34 respectively. These wires 32 and 34 have terminal end portions which extend outwardly from a sheath-like casing 36. More particularly, the heating element 20 has extending outwardly from its sheath, terminal ends 38 and 40. Similarly, the heating element 22 has extending outwardly therefrom terminal end portions 42 and 44. To facilitate electrically connecting the heating elements 20 and 22 to an electric source, a common spade member 46 is welded or fastened in any conventional manner between the terminal ends 38 and 42. Likewise, a spade 48 is fastened to the terminal end 44 and a spade 50 is fastened to the terminal end 40. These spades may be interconnected with any conventional terminal block (not shown) adjacent a range top opening which, for control purposes, leads to a conventional multiple heat switch.

It will be noted that the top surface 14 of the cooking unit 10 is depressed slightly at 52 and, thus, provides a thinner central section for the casting 12 than at the outer peripheral edges 54. This effects a slightly downwardly and radially inwardly tapered top surface 14 for the cooking unit which enhances the stability of utensils placed on the cooking unit 10. It is important to recognize that the recessed or dished out portion must be very shallow. For instance, it is recommended for good heat transfer that a distance no greater than one-thirty-second of an inch exist between the top surface 14 of the cooking unit and the bottom surface of a pan or utensil setting thereon.

The protuberance 18, it will be seen in FIGURE 1, has an irregular configuration to correspond with that configuration given to the heating elements 20 and 22. It is not imperative that this particular configuration be used in every application. The overriding concern is merely that optimum heat distribution be effected between the heating elements 20, 22 and the casting 12. The protuberance 18 has terminal end portions or faces 56 and 58 from which the end segments of the embedded heating elements 20 and 22 project before the segments are off-set downwardly to connect the aforesaid conventional terminal block.

From the foregoing it will be noted that the heating elements 20 and 22 are stacked one on top of the other. This arrangement is particularly effective in eliminating the entwining of the heating elements found necessary in prior art devices wherein the exposed spiral coil elements are used. With the heaters in stacked relationship, the overall mass of the solid plate cooking unit 10 is held to a minimum. Only one protuberance 18 depends from the upper part of the casting 12 and thus the substructure of the cooking unit is held to a minimum.

The use of two coils or heating elements in the solid plate heater 10 of this invention permits higher wattage input to the cooking unit without unduly overburdening either of the heating elements 20 and 22. The watt density or loading of the resistance wires 32 and 34 is important in the design of tubular heaters. Therefore, the double unit casting of this invention makes it possible to increase the total wattage of the cooking unit 10 without overloading either of the resistance wires. Further adding to the durability of the heating elements 20 and 22 is the fact that these elements are embedded within a protuberance cast integrally with the remainder of the cooking unit. In open coil heaters, the atmosphere surrounds the coil or sheath, in the case of the tubular elements, and thus the heating elements tend to overheat when energized without any utensil setting thereon to help remove the heat energy generated. However, in the cast plate of this invention, the heating elements are embedded within a portion of the casting. The casting carries away the heat from the heating elements rapidly to the surface 14 of the cooking unit, thereby aiding in the rapid dissipation of heat from the heating elements. This rapid heat dissipation permits the heating elements 20 and 22 to operate relatively cooler than they could in an open coil arrangement and, thus their operating life is enhanced.

The above described rapid heat removal is also an advantage where the dielectric strength or insulation resistance of the heating elements is of importance. When the heating elements 20 and 22 are maintained at lower operating temperatures, higher wattage inputs to the cooking unit 10 are permitted. This is due, as aforesaid, to the rapid disipation of heat to the plate. A common test for the effectiveness of a cooking unit is a test of the unit's insulation resistance—the tendency for leakage of current at normal operating voltage (236 volts) from the resistance coil in the center of the element to the outer sheath through the surrounding insulation, such as magnesium oxide. It has been found that a cooking unit's insulation resistance is far superior when formed or cast in the manner taught by this invention with the heater elements in stacked relationship in a single protuberance below an integral with an upper cooking plate.

Another of the disadvantages of the open coil type tubular heater is its reluctance to provide even heat distribution to the utensils placed thereon. For this reason, some utensils have been clad with copper or other heat conducting material to spread the heat more evenly. This invention, however, provides a solid plate heater which will effect an improved even heat distribution from the top surface 14 of the cooking unit 10. Where a conventional five-heat switch is used in conjunction with the cooking unit of this invention, a High wattage output setting is obtained with the two heating elements 20 and 22 energized in parallel on 236 volts. The Low setting is accomplished with the heating element 20 energized on 118 volts. The Medium-High setting is fulfilled with the heating element 20 wired for 236 volts and the Medium-Low setting is accomplished with bolt coils 20 and 22 wired in series on 236 volts. The Simmer setting is effected with both elements 20 and 22 wired in series at 118 volts. With other type conventional switches, it is possible to secure up to ten different heats with the cooking unit 10 of this invention. Further, each of the different heats selected will be dissipated quickly from the protuberance 18 surrounding the heating elements and the heat carried rapidly to and dissipated from the surface 14 of the plate-type heater. In practice, it is desirable to select the wattages for the heating elements 20 and 22 such that the heating element 22 will provide the desired heat output, i.e. the exact wattage to effect a Simmer operation. At the same time, a wattage is selected for the top heating element 20 which is just sufficient to accommodate the High setting of the cooking unit 10. It will be noticed that the heating elements 20 and 22 have been arranged to place the higher wattage unit 20 on top of the lower wattage unit 22. This provides for better operating efficiency. It should also be recognized that a variety of heat outputs may be obtained from the surface 14 which are not directly related to the energy inputs of the heating elements 20 and 22 alone. For instance, if the bottom heating element 22 were energized alone, the remote lower location of the heating element 22 will cause a generally smaller percentage of heat to be carried to the top surface 14 than if the top element 20 were energized alone. This concept may be used to gain a variety of in-between outputs for the cooking unit 10 which are not tied to the particular electrical energization of each heating element.

It should now be seen that an improved solid plate heater has been devised wherein a plurality of heat outputs are effected through stacked electrical heating elements housed in a single protuberance on the underside of a small mass casing. The heating elements are flattened slightly to minimize the height of the unit and to further enhance the reduced overall mass of the cooking unit 10. A solid plate heater of the construction here proposed is easy to clean and extremely durable in that the heating elements are housed in a protective sheath of cast material to aid in rapidly dissipating the heat from the heating elements during operation.

While the embodiments of the invention as herein disclosed constitute preferred forms, it is to be understood that other forms might be adopted.

What is claimed is as follows:

1. A solid plate cooking unit comprising, a cast plate member having a relatively thinner central portion and a relatively thicker peripheral portion, said plate member having an irregular protuberance integral with one side thereof, a first tubular heating element in said protuberance adjacent said one side and having a first terminal portion outside of said protuberance, and a second tubular heating element in said protuberance interposed between said first element and said one side and having a second terminal portion outside said protuberance, said first and second terminal portions being grouped in juxtaposition for electrically connecting said cooking unit.

2. A solid plate heater comprising, a cast plate member having a top and bottom surface, said top surface having a relatively dished out central portion, and said bottom surface having a depending integral cast protuberance thereon, a first tubular heating element cast integrally with said protuberance and having terminal end portions extending outwardly from said protuberance, a second tubular heating element cast integrally with said protuberance adjacent said first heating element and having terminal end portions extending outwardly from said protuberance in juxtaposition to said first heating element terminal portions, said terminal end portions having connecting members grouped for association with an electrical source.

3. A solid plate heater comprising, a cast plate member having a top and bottom surface, said bottom surface having a depending integral cast protuberance thereon, a first tubular heating element cast integrally with said protuberance adjacent said bottom surface and having terminal end portions extending outwardly from said protuberance, a second tubular heating element cast integrally with said protuberance in vertically stacked relationship with said first heating element and having terminal end portions extending outwardly from said protuberance in juxtaposition to said first heating element terminal end portions, said terminal end portions having connecting members grouped for association with an electrical source.

4. A solid plate heater comprising, a cast plate member having a top and bottom surface, said bottom surface having a depending integral cast protuberance thereon, a first tubular heating element cast integrally with said protuberance and having terminal end portions extending outwardly from said protuberance, and a second tubular heating element cast integrally with said protuberance in vertically stacked relationship with said first heating element and having terminal end portions extending outwardly from said protuberance.

References Cited in the file of this patent

UNITED STATES PATENTS

| | | |
|---|---|---|
| 1,464,255 | Zimmermann | Aug. 7, 1923 |
| 1,924,409 | Manson | Aug. 29, 1933 |
| 2,213,723 | Smith | Sept. 3, 1940 |
| 2,483,056 | Leckie | Sept. 27, 1949 |
| 2,528,019 | Storm | Oct. 31, 1950 |
| 2,744,995 | Jepson | May 8, 1956 |
| 2,856,508 | Kueser | Oct. 14, 1958 |

FOREIGN PATENTS

| | | |
|---|---|---|
| 435,776 | Great Britain | Sept. 27, 1935 |